(12) United States Patent
Chamoun (10) Patent No.: US 11,668,889 B2
(45) Date of Patent: Jun. 6, 2023

(54) SYSTEM FOR APPLYING PRE-STRAIN TO AN OPTICAL SENSOR

(71) Applicant: Palo Alto Research Center Incorporated, Palo Alto, CA (US)

(72) Inventor: Jacob N. Chamoun, Somerville, MA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 7 days.

(21) Appl. No.: 17/235,101

(22) Filed: Apr. 20, 2021

(65) Prior Publication Data

US 2022/0334335 A1 Oct. 20, 2022

(51) Int. Cl.
*G02B 6/44* (2006.01)
*G02B 6/38* (2006.01)

(52) U.S. Cl.
CPC ......... *G02B 6/4458* (2013.01); *G02B 6/3897* (2013.01); *G02B 6/4415* (2013.01)

(58) Field of Classification Search
CPC ... G02B 6/4458; G02B 6/3897; G02B 6/4415
See application file for complete search history.

(56) References Cited

U.S. PATENT DOCUMENTS

| | | | |
|---|---|---|---|
| 6,587,188 B2 | 7/2003 | Gleine et al. | |
| 6,668,105 B2 | 12/2003 | Chen et al. | |
| 7,251,384 B2 * | 7/2007 | da Silva Junior | G01N 21/45 385/13 |
| 7,315,681 B2 | 1/2008 | Kewitsch | |
| 7,358,858 B2 | 4/2008 | Ozawa et al. | |
| 7,856,888 B2 | 12/2010 | Ferguson | |
| 8,474,742 B2 | 7/2013 | Smrha | |
| 10,295,749 B1 | 5/2019 | Janta-Polczynski et al. | |
| 10,838,163 B2 | 11/2020 | Gronvall | |
| 2003/0077062 A1 * | 4/2003 | Sasaki | G02B 6/25 385/134 |
| 2003/0113087 A1 | 6/2003 | Lee et al. | |
| 2009/0162595 A1 | 6/2009 | Ko et al. | |

(Continued)

FOREIGN PATENT DOCUMENTS

CN 102636838 A * 8/2012
CN 104 033 457 A 9/2014

(Continued)

OTHER PUBLICATIONS

European Patent Application No. 22165830.5, Extended European Search Report dated Oct. 27, 2022; 9 pages.

(Continued)

*Primary Examiner* — Ellen E Kim
(74) *Attorney, Agent, or Firm* — Mueting Raasch Group (57) ABSTRACT

An apparatus has a chassis having a base. A first wall extends substantially perpendicularly from the base at a first edge of the base. The first wall is configured to be a first attachment point for an optical cable comprising one or more optical sensors. An opposing second wall extends substantially perpendicularly from the base at a second edge of the base. A mobile attachment point is configured to be a second attachment point for the optical cable. A spring is coupled to the second wall and the mobile attachment point. The spring is configured to provide a specified force as the mobile attachment point moves.

19 Claims, 7 Drawing Sheets

(56) References Cited

U.S. PATENT DOCUMENTS

| | | | |
|---|---|---|---|
| 2016/0187515 A1* | 6/2016 | De Jong | G01L 11/025 73/705 |
| 2016/0299026 A1* | 10/2016 | De Jong | G01L 7/187 |
| 2017/0235050 A1 | 8/2017 | Kurino et al. | |
| 2019/0062100 A1 | 2/2019 | Mertesdorf | |
| 2020/0103592 A1* | 4/2020 | Matsuda | G02B 6/25 |
| 2020/0292774 A1 | 9/2020 | Bradley et al. | |

FOREIGN PATENT DOCUMENTS

| | | | | |
|---|---|---|---|---|
| CN | 105651319 A | * | 6/2016 | G01D 5/264 |
| CN | 108 508 561 A | | 9/2018 | |
| CN | 111812785 | | 10/2020 | |
| CN | 112217144 | | 1/2021 | |
| DE | 696 14 586 T2 | | 6/2002 | |
| EP | 1 816 432 A1 | | 8/2007 | |
| EP | 2247971 | | 11/2010 | |
| FR | 2630419 | | 10/1989 | |
| JP | H11 218458 A | | 8/1999 | |
| WO | WO-9530926 A1 | * | 11/1995 | G02B 6/022 |
| WO | 2005031401 | | 4/2005 | |
| WO | WO 2018/116130 A1 | | 6/2018 | |
| WO | WO 2021/054350 A1 | | 3/2021 | |

OTHER PUBLICATIONS

European Patent Application No. 22165836.2, Extended European Search Report dated Sep. 5, 2022; 12 pages.

European Patent Application No. 22165800.8, Extended European Search Report dated Aug. 30, 2022; 10 pages.

Friebele et al., "Optical fiber sensors for spacecraft applications," Aug. 9, 1999, *Smart Mater. Struct.*, 8: 813-38.

Loutas et al., "Reliability of strain monitoring of composite structures via the use of optical fiber ribbon tapes for structural health monitoring purposes," Sep. 1, 2015, *Composite Structures*, 134: 762-71.

* cited by examiner

SYSTEM FOR APPLYING PRE-STRAIN TO AN OPTICAL SENSOR

TECHNICAL FIELD

This application relates generally to techniques for structural health monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index modulation and the baseline index of refraction the fiber. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be attached to structures and operated to detect parameters, e.g., strain, temperature, vibration, related to the health of the structures.

SUMMARY

Embodiments described herein involve an apparatus, comprising a chassis having a base. A first wall extends substantially perpendicularly from the base at a first edge of the base. The first wall is configured to be a first attachment point for an optical cable comprising one or more optical sensors. An opposing second wall extends substantially perpendicularly from the base at a second edge of the base. A mobile attachment point is configured to be a second attachment point for the optical cable. A spring is coupled to the second wall and the mobile attachment point. The spring is configured to provide a specified force as the mobile attachment point moves.

Embodiments involve an apparatus, comprising a first side configured to be a first attachment point for an optical cable comprising one or more optical sensors. An opposing second side is configured to be a second attachment point for the optical cable. A pivot point is coupled to the first side and the second side. A first clamp is coupled to the first wall and is configured to attach the optical fiber to the first wall. A second clamp is coupled to the second wall and is configured to attach the optical fiber to the second wall. A screw extends between the first side and the second side. Tightening the screw increases a tension of the optical fiber.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Structural health monitoring is a large and growing field of study that aims to use sensors installed on assets, i.e., structures, to extract useful information about the health or condition of those structures. According to various embodiments described herein, these assets are built with the purpose of supporting loads. The assets can include any structure that can be loaded with objects. For example, the asset may include one or more of a road, a bridge, a runway, a port wharf, a cable structures, and a rail structure. While many embodiments described herein use the example of a bridge structure, it is to be understood that any of the methods and systems described herein can be applied to any type of structure that could benefit from structural health monitoring.

Some embodiments disclosed herein involve apparatuses for attaching fiber optic (FO) sensors to structures. Fiber optic sensors can be deployed on various types of structures, e.g., bridges, roadways, railways, and electrical devices such as transformers, to monitor the structural health of the structures. The disclosed embodiments can facilitate mounting FO sensors to the structures in such a way that strain from the structures is transmitted to the sensors. The approaches discussed herein provide for attachment of FO sensors that is flexible enough to attach the FO sensors to a variety of different substrates, e.g. concrete, metal, and wood. Repeatability of the attachment is desired so that at least some or most of the FO sensors have the same pre-strain once attached. The disclosed attachment approaches can be simple and rapid to perform to facilitate the deployment of multiple FO sensors on a structure. Installing optical fibers on structures involves extensive fiber handling during the install. Optical fibers are fragile, and breaks and/or tangles cost time, which is detrimental e.g. because roads must be shut down to service a structure.

Embodiments described herein are generally directed to installation of sensors on an asset that may be used to monitor the condition and/or health of the asset. The sensors may be optical sensors disposed on an optical fiber are optical sensors. For example, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used. Many embodiments described herein use FBG sensors as an example, but the techniques described may be applicable to other types of sensors as well.

Figure 1A:
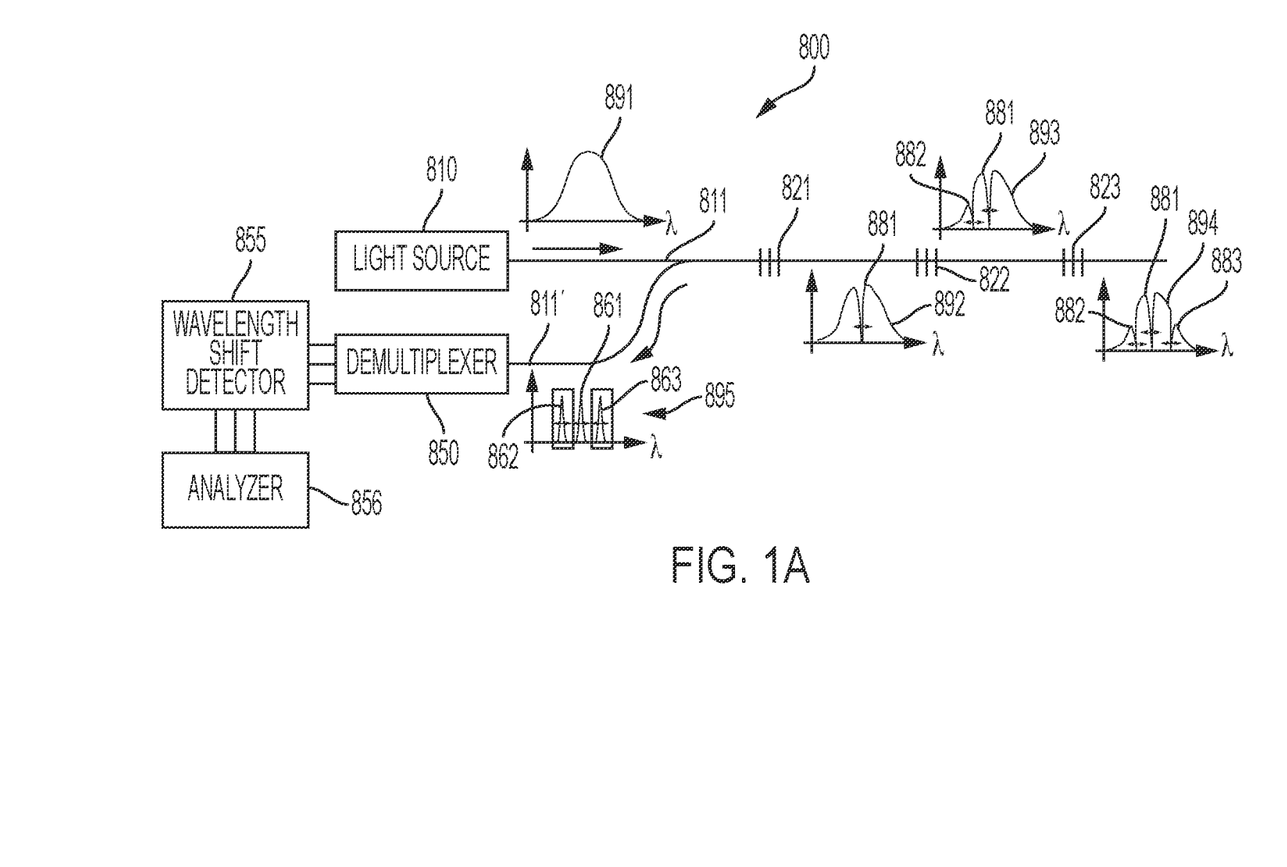
FIG. 1A shows a wavelength multiplexed system can use a compensated sensor array comprising multiple FBG sensors disposed on a single optical fiber in accordance with embodiments described herein.

Fiber optic sensors can simultaneously measure multiple parameters distributed in space with high sensitivity in multiplexed configurations over long FO cables. One example of how this can be achieved is through fiber Bragg grating (FBG) sensors. FIG. 1A shows a wavelength multiplexed system 800 can use a compensated sensor array comprising multiple FBG sensors 821, 822, 823 disposed on a single optical fiber 811. The sensors 821-823 may be arranged to sense parameters including one or more of temperature, strain, and/or vibration, for example. As indicated in FIG. 1A, input light is provided by the light source 810, which may comprise or be a light emitting diode (LED) or superluminescent laser diode (SLD), for example. The spectral characteristic (intensity vs. wavelength) of broadband light is shown by inset graph 891. The intensity is highest near the middle of the spectrum and falls off at the spectrum edges. The sensors 821, 822, 823 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the fiber optic (FO) cable 811 to the first FBG sensor 821. The first FBG sensor 821 reflects a portion of the light in a first wavelength band having a central wavelength, $\lambda 1$. Light having wavelengths other than within the first wavelength band is transmitted through the first FBG sensor 821 to the second FBG sensor 822. The spectral characteristic of the light transmitted to the second FBG sensor 822 is shown in inset graph 892 and exhibits a notch 881 at the first wavelength band centered at $\lambda 1$ indicating that light in this wavelength band is reflected by the first sensor 821.

The second FBG sensor 822 reflects a portion of the light in a second wavelength band having a central wavelength, $\lambda 2$. Light that is not reflected by the second FBG sensor 822 is transmitted through the second FBG sensor 822 to the third FBG sensor 823. The spectral characteristic of the light transmitted to the third FBG sensor 823 is shown in inset graph 893 and includes notches 881, 882 centered at $\lambda 1$ and $\lambda 2$.

The third FBG sensor 823 reflects a portion of the light in a third wavelength band having a central or peak wavelength, $\lambda 3$. Light that is not reflected by the third FBG sensor 823 is transmitted through the third FBG sensor 823. The spectral characteristic of the light transmitted through the third FBG sensor 823 is shown in inset graph 894 and includes notches 881, 882, 883 centered at $\lambda 1$, $\lambda 2$, and $\lambda 3$.

Light in wavelength bands 861, 862, 863, having central wavelengths $\lambda 1$, $\lambda 2$ and $\lambda 3$ (illustrated in inset graph 895) is reflected by the first, second, or third FBG sensors 821, 822, 823, respectively, along the FO cables 811 and 811' to an the optical wavelength demultiplexer 850. Compensating input characteristics of sensors 821, 822, 823 cause the difference in the intensity peaks of the light 861, 862, 863 to be reduced when compared to the intensity peaks from an uncompensated sensor array.

From the wavelength demultiplexer 850, the sensor light 861, 862, 863 may be routed to a wavelength shift detector 855 that generates an electrical signal responsive to shifts in the central wavelengths $\lambda 1$, $\lambda 2$ and $\lambda 3$ and/or wavelength bands of the sensor light. The wavelength shift detector 855 receives reflected light from each of the sensors and generates corresponding electrical signals in response to the shifts in the central wavelengths $\lambda 1$, $\lambda 2$ and $\lambda 3$ or wavelength bands of the light reflected by the sensors 821-823. The analyzer 856 may compare the shifts to a characteristic base wavelength (a known wavelength) to determine whether changes in the values of the parameters sensed by the sensors 821-823 have occurred. The analyzer 856 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having WB2 during time period 2 and sense reflected light during time period 2a that overlaps time period 2. Following time period 2a, the light source may emit light having WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

Figure 1B:
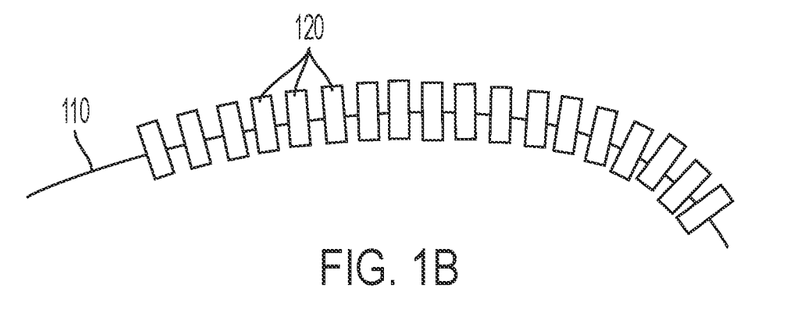
FIG. 1B shows an optical fiber having too little pre-strain in accordance with embodiments described herein.
Figure 1C:
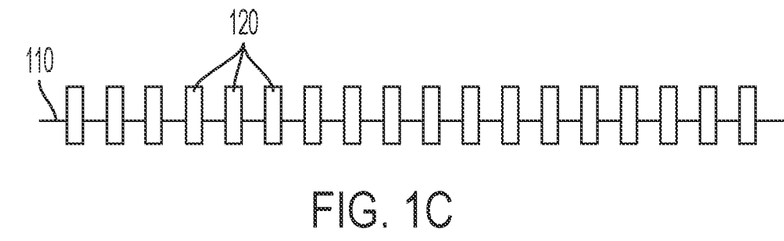
FIG. 1C illustrates an optical fiber having to much pre-strain in accordance with embodiments described herein.
Figure 1D:
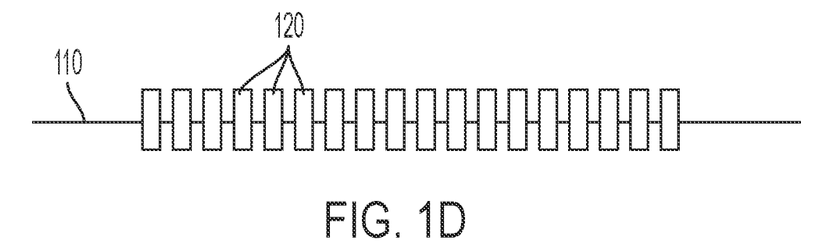
FIG. 1D shows an optical fiber having a correct amount of pre-strain in accordance with embodiments described herein.

FBGs may involve using a specific amount of pre-strain to work properly. Too little strain and the fiber 110 may not be in tension as shown in FIG. 1B, which may reduce sensitivity of the sensors 120. If too much strain is used as shown in FIG. 1C, reflectivity peaks may be outside the range of the read-out system (850, 855, 856). Embodiments herein describe systems for repeatably providing a specific pre-strain to work correctly during mounting of a potentially large number of FBG sensors. FIG. 1D shows an example of a correct amount of pre-strain. This mounting operation could be attaching fibers to an object, a structure, or a template.

FIGS. 2A-2D show an example system to apply a pre-strain to an optical fiber in accordance with embodiments described herein. A chassis 200 is shown having a base 210. A first wall 220 and a second wall 230 are arranged on the same plane and at opposite ends of the base 210. According to various embodiments, one or both of the first wall 220 and the second wall 230 are disposed substantially to extend substantially perpendicularly with respect to the base 210.

One or both of the first wall and the second wall may include an attachment mechanism for detachably securing the optical fiber to the respective first and/or second wall. The attachment mechanism may include one or more of an adhesive mechanism, a magnetic mechanism, a vacuum mechanism, and a mechanical clamping mechanism.

Figure 2A:
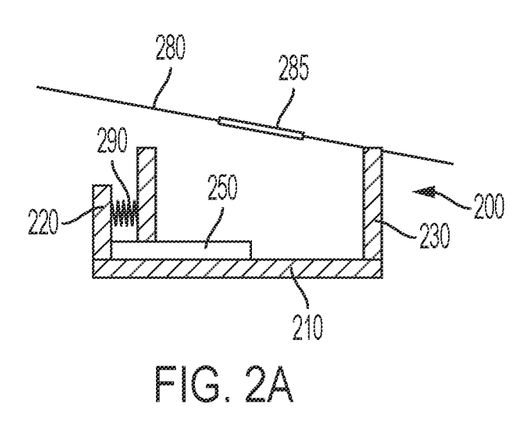
FIGS. 2A-2D show an example system to apply a pre-strain to an optical fiber in accordance with embodiments described herein.
Figure 2B:
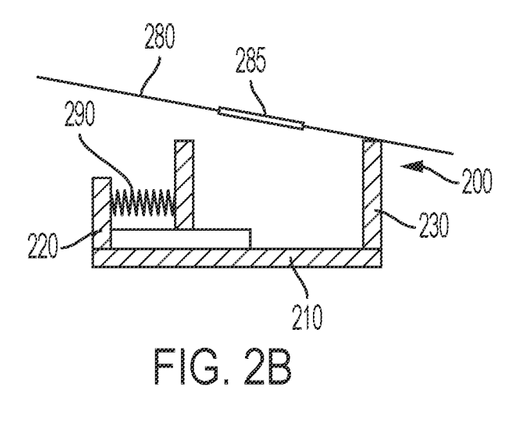

According to various embodiments described herein, the second wall 230 is a fixed fiber attachment point. FIG. 2A shows an optical fiber 280 having a plurality of sensors 285. The optical fiber 280 is temporarily attached to the fixed fiber attachment point 230. In FIG. 2B, a spring 290 is stretched to an extension that is within a specified force range between the first wall 220 and the second wall 230. In some cases, the spring 290 is a flexure of the second wall 220. The spring 290 is connected to the fixed attachment point 230 and to a mobile fiber attachment point 295. The mobile attachment point is disposed between the first wall 220 and the second wall 230 and may be configured to move between the first wall 220 and the second wall 230. A low or substantially no friction mechanism 250 allows the mobile fiber attachment point 295 to move in a linear dimension with respect to the chassis 200 with low friction.

Figure 2C:
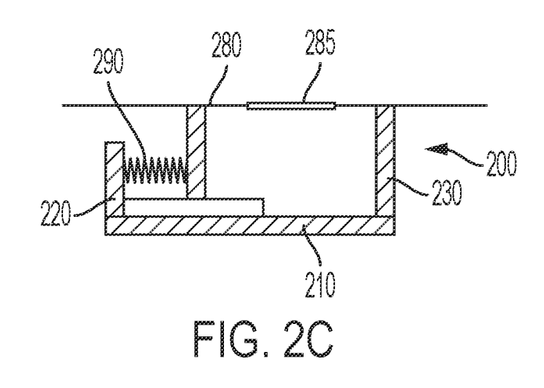
Figure 2D:
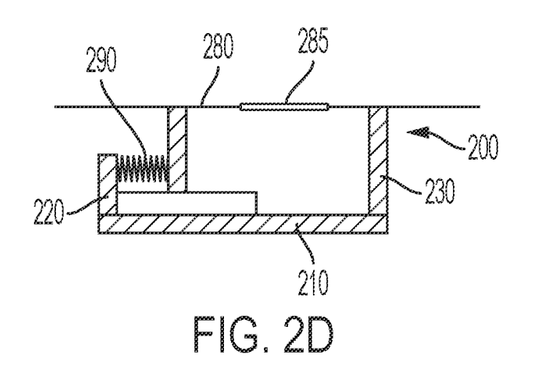

FIG. 2C shows an optical fiber 280 attached to the mobile attachment point 295 with the optical fiber 280 in between the fixed attachment point 230 and the mobile attachment point 295. Finally, the mobile attachment point 295 is released as shown in FIG. 2D and the spring 290 exerts a restoring force that stretches the optical fiber 280 with a force substantially equal to the restoring force of the spring 290. The restoring force of the spring 290 may be proportional to the defection of the spring 290. The specific restoring force of the spring 290 is chosen based on the optical fiber type to provide the desired pre-strain in the optical fiber. According to various embodiments described herein, the restoring force is in a range of about 0.1 N to about 10 N. In some cases, the restoring force is about 1 N. One or both of the restoring force and the displacement of the second attachment point 295 is indicated by a dial, a display, and/or other type of indicator.

The constant force is the value [e.g., in newtons] of the force provided by a constant force spring when it is extended within its constant force range. The constant force value depends the design of the spring. For example, the constant force value depends on the material and/or the winding radius of the constant force spring. The specified force is the desired force to pre-strain the fiber by a desired amount. For a pre-strain tool using a CFS, a CFS may be chosen that has a constant forced equal to the desired force.

For a pre-strain tool using a Hooke's law spring, the force or extension need to be set precisely, using an indicator, for example For a CFS, so long as the extension is within the constant force range, it is known that the constant force is being substantially achieved. we are getting the constant force.

Figure 3:
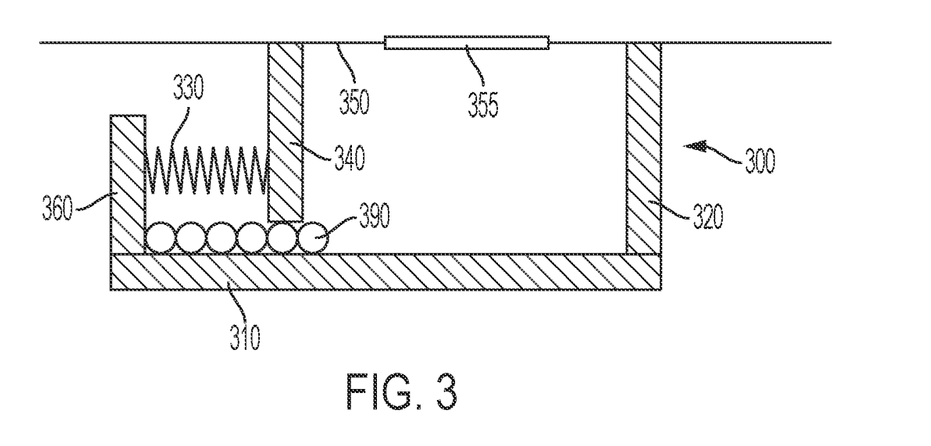
FIG. 3 illustrates an example system that includes a bearing mechanism to provide the low or substantially no friction as the mobile attachment point is moved between the first wall and the second wall in accordance with embodiments described herein.

FIG. 3 illustrates an example system that includes a bearing mechanism to provide the low or substantially no friction as the mobile attachment point is moved between the first wall and the second wall in accordance with embodiments described herein. In this example, the chassis 300 includes a base 310 and a first wall 360 and a second wall 320 that are arranged at opposite ends of the base 310. An optical fiber 350 having a plurality of sensors 355. The optical fiber 320 is temporarily attached to the first wall 360 that serves as a fixed fiber attachment point. A spring 330 is stretched to an extension that is within a specified force range between the first wall 360 and the second wall 320. The spring 330 is connected to the first wall 360 and to a mobile fiber attachment point 340. The mobile attachment point 340 is disposed between the first wall 360 and the second wall 320 and may be configured to move between the first wall 360 and the second wall 320. A bearing mechanism 390 allows the mobile fiber attachment point 340 to move in a linear dimension with respect to the chassis 300 with low friction.

Figure 4:
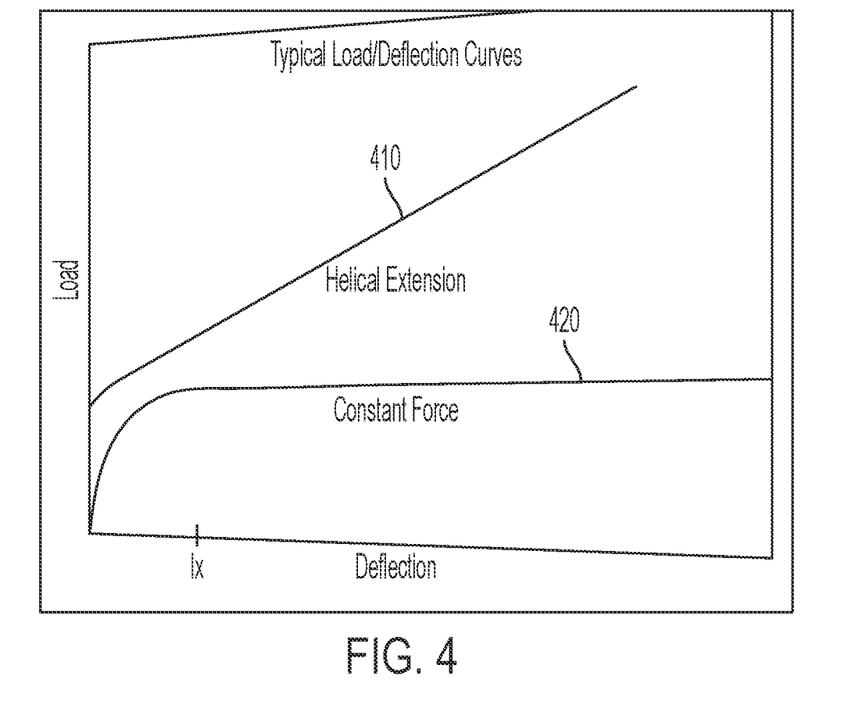
FIG. 4 illustrates the load versus deflection for a constant force spring in accordance with embodiments described herein.

According to various embodiments, the spring is a constant force spring (CFS). A CFS is a pre-tensioned metal strip where the restoring force tends to make the strip curl up. The restoring force of a CFS is substantially constant over a certain range of deflection. This type of spring is commonly used in tape measures and other retractable reels. The CFS provides a repeatable way to set the fiber pre-strain. Because the CFS applies the same force anywhere within its constant force range, the position of the attachment points is not critical. So long as the FBG is between the two fiber attachment points, the FBG will be under the same tension. This greatly relaxes the complexity of fiber handling during an install. FIG. 4 illustrates the load versus deflection for a constant force spring in accordance with embodiments described herein. As can be observed, as the helical extension 410 increases, the CFS provides a substantially constant force 420 after a deflection of 1×.

Figure 5A:
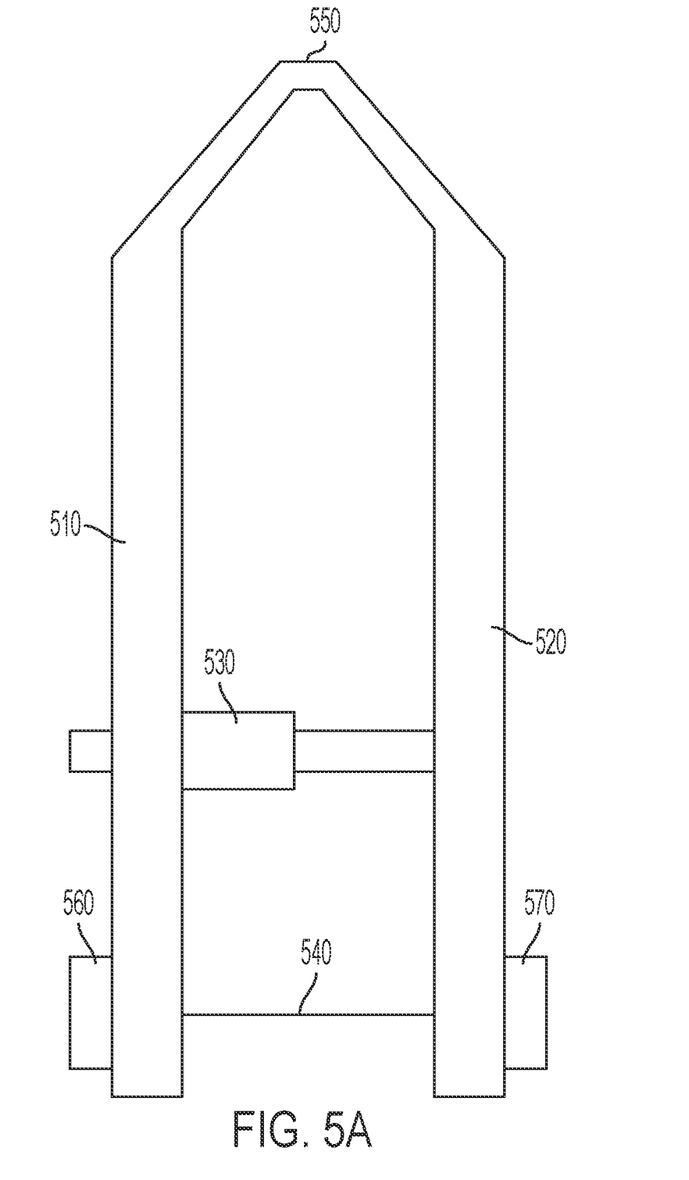
FIGS. 5A and 5B show another example of a system to provide pre-strain to an optical fiber comprising two sides and a pivot point in accordance with embodiments described herein.
Figure 5B:
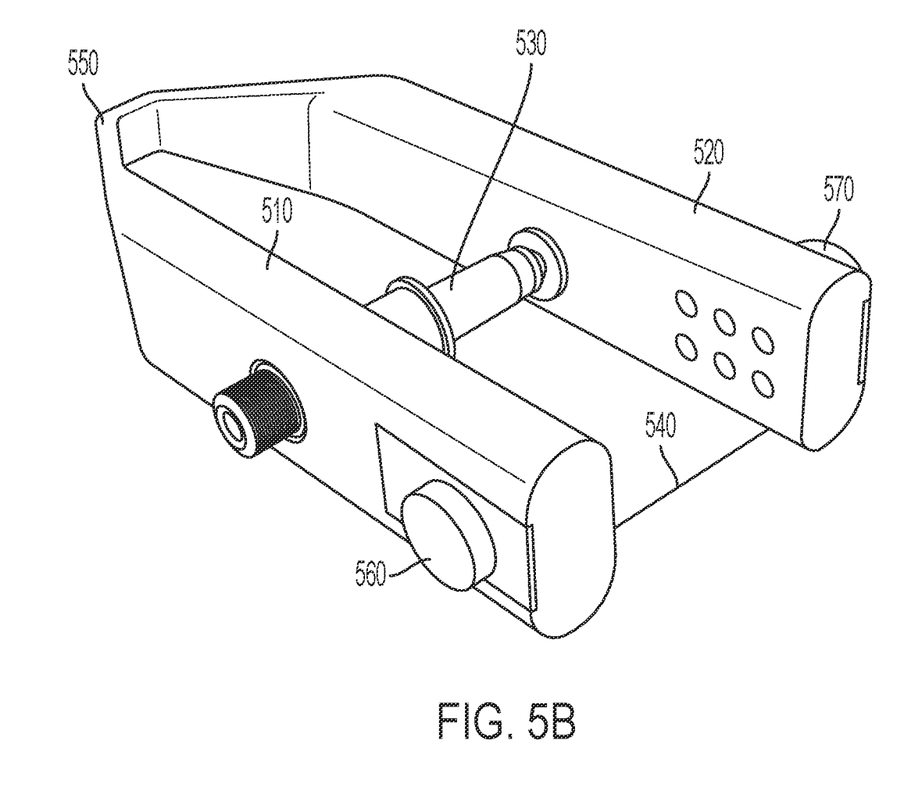

FIGS. 5A and 5B show another example of a system to provide pre-strain to an optical fiber in accordance with embodiments described herein. FIG. 5A shows tweezers having fiber clamps 560, 570. The clamps 560 570 may be any type of removable clamp. For example, the clamps may be one or more of an adhesive mechanism, a magnetic mechanism, a vacuum mechanism, and a mechanical clamping mechanism. A micrometer screw 530 is used to directly adjust the pre-strain of the optical fiber 540 that is stretched between a first side 510 and a second side 520. The first side 510 and the second side 520 are coupled via a pivot point 550. The tool of FIGS. 5A and 5B may be configured to allow the optical fiber to be put in contact with an installation surface for subsequent bonding. A desired pre-strain is applied and after the fiber has been installed, the clamps 560, 570 can be released and the tool removed leaving the pre-strained fiber attached to the surface. A force or deflection sensor may be disposed between the micrometer screw 530 and the first side 510. The current pre-strain of the optical fiber 540 may be estimated based on the force sensed by the force sensor. Some embodiments may have an encoder to assist with setting the desired pre-strain. According to various embodiments, it may be difficult to get the desired pre-strain with the available screw. A reduction gear may make it easier for a user to get the desired pre-strain.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. An apparatus for pre-straining a segment of an optical cable, comprising:
   a chassis comprising:
   a base;
   a first wall extending substantially perpendicularly from the base at a first edge of the base, the first wall configured to be a first attachment point for the optical cable comprising one or more optical sensors;
   an opposing second wall extending substantially perpendicularly from the base at a second edge of the base;
   a mobile attachment point configured to be a temporary second attachment point for the optical cable; and
   a spring coupled to the second wall and the mobile attachment point, the spring configured to provide a specified force as the mobile attachment point moves laterally between the first wall and the second wall which causes a predetermined pre-strain to be applied to the segment of the optical cable that includes at least one of the optical sensors.

2. The apparatus of claim 1, wherein the one or more optical sensors comprise one or more fiber Bragg grating (FBG) sensors.

3. The apparatus of claim 1, wherein the spring is a constant force spring that is configured to provide a constant force as the mobile attachment point moves laterally between the first wall and the second wall.

4. The apparatus of claim 3, wherein the constant force spring is configured to be stretched to a stretched extension that is within a constant force range.

5. The apparatus of claim 4, wherein the constant force spring is configured to exert a restoring force that stretches the optical cable with a force substantially equal to the restoring force of the constant force spring when the mobile attachment point is released from the stretched extension.

6. The apparatus of claim 5, wherein the restoring force may be chosen based on a type of optical cable to provide the predetermined pre-strain.

7. The apparatus of claim 5, wherein the restoring force is in a range of about 0.1 N to about 10 N.

8. The apparatus of claim 5, wherein the restoring force is about 1 N.

9. The apparatus of claim 1, further comprising a bearing mechanism disposed on the base and configured to allow the mobile attachment point to move laterally along the base.

10. The apparatus of claim 1, wherein the first and second attachment points are reversible.

11. The apparatus of claim 1, wherein at least one of the first point and the second attachment point comprises one or more of a magnetic attachment, clamp, adhesive, and a vacuum.

12. The apparatus of claim 1, wherein the spring exerts a restoring force proportional to its deflection.

13. The apparatus of claim 12, wherein the spring is a flexure of the second wall.

14. The apparatus of claim 12, wherein the restoring force is indicated by a dial, display, or other indicator.

15. The apparatus of claim 12, wherein a displacement of the second attachment point is indicated by a dial, display, or other indicator.

16. The apparatus of claim 12, wherein the restoring force is in a range of 0.1-10 N.

17. The apparatus of claim 1, wherein the mobile attachment point is disposed between the first wall and the second wall and is configured to move laterally between the first wall and the second wall.

18. The apparatus of claim 1, wherein the mobile attachment point is disposed on the second wall.

19. The apparatus of claim 1, the first attachment point is a temporary attachment point for the optical cable.

* * * * *